United States Patent
Cerezales Arroyo

(10) Patent No.: US 11,533,917 B2
(45) Date of Patent: Dec. 27, 2022

(54) METHOD FOR PRODUCING GLUTEN-FREE BAKERY AND PATISSERIE PRODUCTS AND GLUTEN-FREE BAKERY AND PATISSERIE PRODUCTS OBTAINED

(71) Applicant: CASTAFARINA S.L., Las Rozas de Madrid (ES)

(72) Inventor: Luis Cerezales Arroyo, Las Rozas de Madrid (ES)

(73) Assignee: CASTAFARINA S.L., La Rozas de Madrid (ES)

( * ) Notice: Subject to any disclaimer, the term of this patent is extended or adjusted under 35 U.S.C. 154(b) by 461 days.

(21) Appl. No.: 16/651,857

(22) PCT Filed: Sep. 29, 2017

(86) PCT No.: PCT/ES2017/000120
§ 371 (c)(1),
(2) Date: Mar. 27, 2020

(87) PCT Pub. No.: WO2019/063851
PCT Pub. Date: Apr. 4, 2019

(65) Prior Publication Data
US 2020/0253220 A1    Aug. 13, 2020

(51) Int. Cl.
| A21D 13/066 | (2017.01) |
| A21D 13/22 | (2017.01) |
| A21D 8/02 | (2006.01) |
| A21D 8/06 | (2006.01) |

(52) U.S. Cl.
CPC .......... *A21D 13/066* (2013.01); *A21D 8/025* (2013.01); *A21D 8/06* (2013.01); *A21D 13/22* (2017.01)

(58) Field of Classification Search
None
See application file for complete search history.

(56) References Cited

FOREIGN PATENT DOCUMENTS

| CN | 101155514 A | * | 4/2008 | ............. A21D 13/04 |
| EP | 2548442 A1 | | 1/2013 | |
| ES | 2585630 T3 | | 10/2016 | |
| ES | 2585890 T3 | | 10/2016 | |
| JP | 2015107081 A | * | 6/2015 | ............. A21D 2/10 |
| JP | 2016165374 A | * | 9/2016 | ............. A47J 37/00 |
| RS | 20090143 A | | 4/2011 | |
| WO | 2017089625 A1 | | 6/2017 | |

OTHER PUBLICATIONS

Machine translation of WO 2017089625, publication date Jun. 1, 2017, pp. 1-4. (Year: 2017).*
Machine translation of JP 2015-107081, publication date Jun. 11, 2015, pp. 1-14. (Year: 2015).*
Machine translation of JP 2016-165374, publication date Sep. 15, 2016, pp. 1-11. (Year: 2016).*
Machine translation of CN 101155514, publication date Apr. 2, 2008, pp. 1-9. (Year: 2008).*
Int'l Search Report received in copending PCT Application No. PCT/ES2017/000120 dated Jan. 17, 2018, 4 pages (including translation).

* cited by examiner

*Primary Examiner* — Jenna A Watts
(74) *Attorney, Agent, or Firm* — Blank Rome LLP

(57) ABSTRACT

The invention relates to a method for producing gluten-free bakery and patisserie products and to the gluten-free bakery and patisserie products obtained, the method facilitating natural baking by means of the addition of between 60 and 110% of water to the mixture of ingredients, owing to the high water requirements of fibres that act as substitutes for the gluten in traditional baking, and the production of an oxygenated colloidal dough from this hydrated dough, to facilitate, when applicable, the subsequent leavening thereof, during and after the production of the colloidal dough. The leavened or unleavened gluten-free bakery and patisserie products obtained have organoleptic and rheological proprieties similar to those of products with gluten.

11 Claims, No Drawings

METHOD FOR PRODUCING GLUTEN-FREE BAKERY AND PATISSERIE PRODUCTS AND GLUTEN-FREE BAKERY AND PATISSERIE PRODUCTS OBTAINED

CROSS REFERENCE TO RELATED APPLICATION

This application is a national stage of International Patent Application No. PCT/ES2017/000120, filed Sep. 29, 2017, the entire contents of which are incorporated herein by reference.

OBJECT OF THE INVENTION

The objects of the present invention are a novel method for producing gluten-free bakery and patisserie products and the leavened and unleavened gluten-free bakery and patisserie products obtained. The method is carried out by means of physical technological processes which differ substantially from the conventional baking technique, preferably avoiding the use of additives which act as gluten substitutes.

The products obtained, i.e., the leavened or unleavened gluten-free bakery and patisserie products, acquire organoleptic and rheological properties similar to those of bakery and patisserie products with gluten and produced using conventional methods.

BACKGROUND OF THE INVENTION

Gluten is a group of small sized proteins contained exclusively in flour made from grains, fundamentally wheat, but also in barley, rye, and oats. Gluten is highly valued for its viscoelastic qualities which provide elasticity to the flour dough, and this, along with the leavening of the dough, allows bread to obtain the volume and the elastic and spongy consistency of baked breads and dough.

Gluten causes celiac disease or non-celiac gluten sensitivity in some people. The number of people with this condition has increased exponentially in recent years in light of health awareness campaigns and their corresponding controls and analyses. These people obviously require products similar to conventional bakery and patisserie products which, however, do not have gluten.

Conventional bread-like gluten-free products existing on the market do not have organoleptic and rheological properties similar to the properties of conventional bakery and patisserie products with gluten, so it can be asserted that there is no product which brings about satisfaction for a majority and meets all consumer requirements.

As a result, many individuals, companies, and researchers have made daily efforts to obtain gluten-free bakery and patisserie products having properties comparable to products with gluten, as disclosed in Spanish patent documents ES 2585630 and ES 2585890.

The fact that the dough does not contain gluten makes the process for elaborating same particularly complicated and the attempt has been made to replace same by means of incorporating additives which contribute to achieving the rheological properties that gluten-free dough lacks.

In that sense, all kinds of emulsifiers, antioxidants, humectants, stabilizers, thickeners, and other additives, that are obviously permitted by law and authorized by the relevant authorities, are often used as technological resources for replacing gluten in product baking.

The present invention was conceived for the purpose of obtaining flavorful bakery and patisserie products having a nice color and a pleasant texture and smell, with the right amount of moisture, well formed and airy center, as well as a crispy crust.

DESCRIPTION OF THE INVENTION

The method for producing patisserie and bakery products for obtaining unleavened bakery and patisserie products comprises the following steps:

a. mixing at least the following solid ingredients: gluten-free flours, gluten-free starches, gluten-free fibers, and gluten-free enzymes, obtaining a mixture of solids, b. adding water to the mixture of solids in a proportion between 60% and 110% of the weight of the mentioned mixture of solids, obtaining a hydrated mixture, c. stirring the hydrated mixture in a rapid mixer, obtaining a pre-dough, d. performing ultra-fine wet grinding of the pre-dough, obtaining a colloidal dispersion, in which the size of the solid particles is comprised between 10 and 100 nanometers, e. aerating the colloidal dispersion, obtaining a colloidal dough, f. extruding the colloidal dough, obtaining an extruded colloidal dough, g. cutting the extruded colloidal dough to one or more measurements, obtaining pieces of extruded colloidal dough, h. performing baking for the initial cooking and drying of the pieces of extruded colloidal dough in a microwave oven of between 2.45 GHz and 9.15 GHz for between 2 and 25 minutes until the moisture content of the pieces of extruded colloidal dough is between 40% and 60% and the temperature of the mentioned pieces is between 80° C. and 95° C., obtaining cooked pieces, i. performing aqueous vaporization or spraying of the cooked pieces in a chamber in which water is vaporized or sprayed until the environment in the chamber reaches a relative humidity of 99%, obtaining pieces of semi-finished bakery or patisserie products, j. optionally, performing baking for the final cooking of the pieces of semi-finished bakery or patisserie products in a radiation oven heated by convection and conduction for a time between 2 and 25 minutes, obtaining finished pieces of bakery and patisserie products with a moisture content between 0% and 40%.

The method for producing gluten-free leavened bakery and patisserie products comprises the following steps:

a) mixing at least the following solid ingredients: gluten-free flours, gluten-free starches, gluten-free fibers, gluten-free yeasts, and gluten-free enzymes, obtaining a mixture of solids, b) adding water to the mixture of solids in a proportion between 60% and 110% of the weight of the mentioned mixture of solids, obtaining a hydrated mixture, c) stirring the hydrated mixture in a rapid mixer, obtaining a pre-dough, d) performing ultra-fine wet grinding of the pre-dough, obtaining a colloidal dispersion, in which the size of the solid particles is comprised between 10 and 100 nanometers, e) aerating the colloidal dispersion, obtaining a colloidal dough, f) extruding the colloidal dough, obtaining an extruded colloidal dough, g) cutting the extruded colloidal dough to one or more measurements, obtaining pieces of extruded colloidal dough,
h) performing continuous controlled leavening of the pieces of extruded colloidal dough at a temperature between 25 C and 40° C., maintaining the moisture content of the mentioned pieces of extruded colloidal dough, obtaining leavened pieces,
i) performing baking for the initial cooking and drying of the leavened pieces in a microwave oven of between 2.45 GHz and 9.15 GHz for between 2 and 25 minutes until the moisture content of the leavened pieces is between 40% and 60% and the temperature of the mentioned leavened pieces is between 80° C. and 95° C., obtaining cooked pieces,
j) performing aqueous vaporization or spraying of the cooked pieces in a chamber in which water is vaporized or sprayed until the environment in the chamber reaches a relative humidity of 99%, obtaining pieces of semi-finished bakery or patisserie products,
k) optionally, performing baking for the final cooking of the pieces of semi-finished bakery or patisserie products in a radiation oven heated by convection and conduction for a time between 2 and 25 minutes, obtaining pieces of finished bakery or patisserie products with moisture contents between 0% and 40% according to the type obtained.

Preferred Embodiments

In a preferred embodiment, the method for producing gluten-free leavened bakery and patisserie products, and specifically gluten-free leavened bread, which is one of the objects of the present description, comprises the following steps:
a) Mixing at least the following solid ingredients (the following percentages refer to the total weight of the mixture of solids):
  gluten-free flours: 60%,
  gluten-free starches: 30.5%,
  gluten-free fibers, preferably *psyllium* husk: 3%, and
  gluten-free enzymes, preferably transglutaminase and amylanase: 0.5%,
  salt: 2%
  gluten-free yeast: 4% obtaining a mixture of solids.
b) Adding water to the mixture of solids preferably in a proportion between 80% and 110% of the weight of the mentioned mixture of solids, obtaining a hydrated mixture. High hydration is obtained compared to the moisture percentage of between 40% and 60% of the mixture of solids for the preparation of bakery or patisserie products with gluten. Natural fiber, which acts as an adhesive substance replacing gluten, requires high proportions of water in relation to the solid ingredients in stark contrast with conventional baking.
c) Stirring the hydrated mixture, obtaining a pre-dough. This pre-dough is a substance with variable consistency which has developed from a loose, soft, and sticky texture to another compact, malleable, and lumpy texture during stirring.
d) Performing ultra-fine wet grinding of the pre-dough, obtaining a colloidal dispersion with adsorption effects characteristic of colloids, in which the size of the solid particles is comprised between 10 and 100 nanometers.
e) Aerating the colloidal dispersion, obtaining a colloidal dough. This step increases the oxygenation of the colloidal dispersion obtained in the preceding step and can be carried out in the colloidal grinding chamber itself at atmospheric pressure or overpressure using a pneumatic compressor for food use.
f) Extruding the colloidal dough, obtaining an extruded colloidal dough, by means of an extruder having interchangeable nozzles of a different diameter which correspond with the diameter of the pieces to be finished.
g) Cutting the extruded colloidal dough to one or more measurements, obtaining pieces of extruded colloidal dough, by means of a guillotine or a cutter.
h) Performing continuous controlled leavening of the pieces of extruded colloidal dough preferably at a temperature of 35° C., increasing its volume and maintaining the moisture content of the mentioned pieces of extruded colloidal dough, obtaining leavened pieces. The increase in volume is due to the fact that the weak leavening effects in gluten-free dough are improved by the colloidal dough oxygenated in steps d) and e).
i) Performing baking for the initial cooking and drying of the leavened pieces in a microwave oven of 2.45 GHz for between 2 and 25 minutes until the moisture content of the leavened pieces is between 40% and 60% and the temperature of the mentioned pieces is between 80° C. and 87° C., obtaining cooked pieces. This quick drying and cooking gives rise to firm airy center consolidating the volume of the cooked pieces and preventing them from collapsing and flattening, and it also gives rise to a thin and flexible crust-precursor film which uniformly covers the entire cooked piece.
j) Using ultrasounds, spraying water on the cooked pieces in a convection oven, in which water is vaporized or sprayed until the environment in the chamber reaches a relative humidity of 99%, obtaining pieces of semi-finished bread. Water is vaporized or sprayed on the cooked pieces for the purpose forming a thin crispy crust in subsequent baking and preventing the crust from being too thick and hard.
k) Performing baking for the final cooking of the pieces of semi-finished bread products in a convection oven for a time between 2 and 25 minutes, depending on the size of the mentioned pieces of semi-finished bread, obtaining gluten-free finished bread. Said baking can be carried out by means of infrared or ceramic plate radiation or other types of conventional baking.

After performing the method described above, the pieces of bread would only have to be left to cool by leaving them stand or by forced cooling before they are ready for packaging and distribution to the points of sale.

If the objective of the method is to obtain unleavened gluten-free bakery and patisserie products, such as unleavened gluten-free bread in particular, it would be necessary to eliminate yeast from the mixture of solids and the step of leavening the extruded colloidal dough.

In both methods, the colloidal dough can be extruded in a 3D printer which, in addition to extruding the colloidal dough renders a predetermined shape, for example, round shapes, useful for the elaboration of products for pizza bases, or any other desired shape.

In the methods for obtaining leavened or unleavened products, the steps of performing baking for the initial cooking and drying, water vaporization or spraying, and baking for the final cooking can be performed successively, or simultaneously, or only the steps of performing vaporization or spraying and baking for the final cooking are performed simultaneously, and the ultra-fine grinding and aerating steps can also be performed simultaneously.

As any professional in the baking sector can infer from the description of the method object of the invention, the different hardnesses and textures may require different adaptations of the parameters of the steps of the method, for example, temperature, times, or size of the colloidal particles, in addition to the ingredients of the different mixtures of solids, for manufacturing different types of gluten-free bread, among which it is well worth the effort to highlight, without limitation, the following:

Natural gluten-free bread: bread in which all its ingredients are only natural products.

Precooked gluten-free natural bread: this type of bread constitutes the pieces of semi-finished bread obtained in step j) which are frozen or kept in a modified atmosphere for distribution and subsequent baking at home, in places of consumption, or specialized points of sale.

Gluten-free natural wholemeal bread: bread in which at least 51% of its formulation consists of wholemeal ingredients.

Precooked gluten-free wholemeal bread: this type of bread constitutes the pieces of semi-finished bread, in which at least 51% of its formulation consists of wholemeal ingredients obtained in step j) which are frozen or kept in a modified atmosphere for distribution and subsequent baking at home, in places of consumption, or specialized points of sale.

Gluten-free bread loaf: bread baked in a mold.

Gluten-free wholemeal bread loaf: bread baked in a mold in which at least 51% of its formulation consists of wholemeal ingredients.

Gluten-free breadcrumbs: ground bread originating from pieces of gluten-free bread hardened using natural or forced methods.

Gluten-free local, regional, national breads or gluten-free breads for specific consumption, such as Vienna bread, French bread, baguette, ciabatta, hot dog bun, or hamburger bun, etc.: gluten-free breads of this type incorporate among other ingredients different types of fats, oils, dairy products, eggs, or different additives.

Gluten-free toasted bread: the pieces of gluten-free bread are then cut into slices and baked again to obtain a hard and crispy texture, providing other ingredients or additives which contribute to better elaboration.

Gluten-free toasted wholemeal bread loaf: bread loaf similar to the preceding one but in which at least 51% of its formulation consists of wholemeal ingredients.

Gluten-free bread with seeds: bread with seeds incorporated before or after the baking step.

Gluten-free bread with fruits: bread with added fruits (such fruits include, without limitation, berries and/or dried fruits and nuts) before or after the baking step.

Gluten-free snack-type bread: gluten-free bread which, after baking step k), is subjected to different baking processes to achieve the different textures of each type of snack such as elongated stick-shaped snacks, ring-shaped snacks, etc.

Leavened or unleavened gluten-free flat breads which may have incorporated on their surface fruits (such fruits include, without limitation, berries and/or dried fruits and nuts), and/or other food products.

Gluten-free crusts for pizzas or similar products such as cocas (a Spanish pizza-type pastry): these may have incorporated on their surface food products such as tomato, cheese, fish, meat, vegetables, or any other product that a pizza may have.

The invention claimed is:

1. A method for producing gluten-free bakery and patisserie products comprising the following steps:
    a. mixing at least the following solid ingredients: gluten-free flours, gluten-free starches, gluten-free fibers and gluten-free enzymes, obtaining a mixture of solids,
    b. adding water to the mixture of solids in a proportion between 60% and 110% of the weight of the mentioned mixture of solids, obtaining a hydrated mixture,
    c. stirring the hydrated mixture in a rapid mixer, obtaining a pre-dough,
    d. performing ultra-fine wet grinding of the pre-dough, obtaining a colloidal dispersion, in which the size of the solid particles is comprised between 10 and 100 nanometers,
    e. aerating the colloidal dispersion, obtaining a colloidal dough,
    f. extruding the colloidal dough, obtaining an extruded colloidal dough,
    g. cutting the extruded colloidal dough to one or more measurements, obtaining pieces of extruded colloidal dough,
    h. performing baking for an initial cooking and drying of the pieces of extruded colloidal dough in a microwave oven of between 2.45 GHz and 9.15 GHz for between 2 and 25 minutes until the moisture content of the pieces is between 40% and 60% and the temperature of the mentioned pieces is between 80° C. and 95° C., obtaining cooked pieces,
    i. performing aqueous vaporization or spraying of the cooked pieces in a chamber in which water is vaporized or sprayed until the environment in the chamber reaches a relative humidity of 99%, obtaining pieces of semi-finished bakery or patisserie products.

2. The method according to claim 1, wherein step i) of performing aqueous vaporization or spraying is carried out by means of spraying water using ultrasounds.

3. The method to of claim 1, further comprising, after step i) of performing vaporization or spraying, a step j) of performing baking for a final cooking of the pieces of semi-finished bakery or patisserie products in a radiation oven heated by convection and conduction for a time between 2 and 25 minutes, obtaining pieces of finished bakery or patisserie products with a moisture content between 0% and 40%.

4. The method of claim 1, wherein gluten-free yeasts are incorporated in step a) and wherein a continuous controlled leavening of the pieces of extruded colloidal dough is carried out between step g) and step h) at a temperature between 25° C. and 40° C., maintaining the moisture content of the mentioned pieces of extruded colloidal dough, obtaining leavened pieces.

5. The method of claim 1, wherein the ultra-fine grinding and aerating steps are performed simultaneously.

6. The method of claim 1, wherein the steps of performing baking for the initial cooking and drying and performing water vaporization or spraying are performed simultaneously.

7. The method of claim 1, wherein the pieces of semi-finished bakery or patisserie products are frozen after the step of performing water vaporization or spraying.

8. The method of claim 1, wherein the pieces of semi-finished bakery or patisserie products are kept in a modified atmosphere after the step of performing water vaporization or spraying.

9. The method of claim 1, wherein after the step of performing water vaporization or spraying, one or more of the following products are added to the surface of the pieces of semi-finished bakery or patisserie products: seeds, fruits, other food products.

10. The method of claim 3, wherein the steps of performing baking for the initial cooking and drying, water vaporization or spraying, and baking for the final cooking are performed simultaneously.

11. The method of claim 3, wherein after the step of performing baking for the final cooking one or more of the following products are added to the surface of the pieces of finished bakery or patisserie products: seeds, fruits, other food products.

* * * * *